(12) United States Patent
James

(10) Patent No.: US 6,934,717 B1
(45) Date of Patent: Aug. 23, 2005

(54) DATABASE ACCESS

(75) Inventor: Derek Robert James, Harpenden (GB)

(73) Assignee: British Telecommunications public limited company, London (GB)

( * ) Notice: Subject to any disclaimer, the term of this patent is extended or adjusted under 35 U.S.C. 154(b) by 918 days.

(21) Appl. No.: 09/029,581

(22) PCT Filed: Dec. 2, 1996

(86) PCT No.: PCT/GB96/02977

§ 371 (c)(1),
(2), (4) Date: Mar. 6, 1998

(87) PCT Pub. No.: WO97/21177

PCT Pub. Date: Jun. 12, 1997

(30) Foreign Application Priority Data

Dec. 1, 1995 (GB) .......................... 95308682

(51) Int. Cl.[7] ............................................. G06F 17/00
(52) U.S. Cl. .................................................. 707/104.1
(58) Field of Search ..................................... 707/1–206

(56) References Cited

U.S. PATENT DOCUMENTS

| 5,446,871 | A | * | 8/1995 | Shomler et al. ................ 714/1 |
| 5,550,971 | A | * | 8/1996 | Brunner et al. .............. 707/100 |
| 5,592,618 | A | * | 1/1997 | Micka et al. ................. 714/54 |
| 5,649,185 | A | * | 7/1997 | Antognini et al. ............. 707/9 |
| 5,682,527 | A | * | 10/1997 | Cooper et al. .............. 707/100 |
| 5,835,908 | A | * | 11/1998 | Bennett et al. ............... 707/10 |
| 6,032,145 | A | * | 2/2000 | Beall et al. .................... 707/5 |
| 6,324,534 | B1 | * | 11/2001 | Neal et al. ..................... 707/3 |

OTHER PUBLICATIONS

Pleanary Session, Emerging Technologies, and Factory Automation, Maui, Nov. 15–19, 1993, vol. 1, Institute of Electrical and Electronics Engineers, pp. 103–108, XP000451782 Lim S B et al: "A Remote File System for Heterogeneous Network Topologies" see p. 104, col. 1, line 46–p. 106, col. 1, line 35; figure 1.

Computer Standards and Interfaces, vol. 14, No. 3, Jan. 1, 1992, pp. 191–208, XP000267365 Marshall A D et al: on the Feasibility of ISO FTAM–Based File Servers to Implement a Heterogeneous File System: see p. 192, col. 1, line 29—p. 193, col. 1, line 27.

Operating System Review (SIGOPS), vol. 23, No. 5, Jan. 1, 1989, pp. 45–57, XP000115487 Srinivasan V et al: Spritely NFS: Experiments With Cache–Consistency Protocols: see abstract see p. 45, col. 1, line 19—p. 49, col. 2, line 48.

* cited by examiner

Primary Examiner—Alford Kindred
Assistant Examiner—Sana Al-Hashemi
(74) Attorney, Agent, or Firm—Nixon & Vanderhye P.C.

(57) ABSTRACT

In a client/server computer environment having a fileserver running a mater database and clients supporting cache databases, inconsistent data write accesses are prevented by using a data locking technique, which locks data during the course of an up-date transaction requested by one client. This prevents access to the same data by another client. Data consistency is checked prior to the write access, by comparing a time stamp associated with a respective cache database entry and a time stamp associated with the index to the corresponding data entry in the master database. Time stamp equivalence obviates the need to access the master database or to transfer data across the client/server communications network.

9 Claims, 15 Drawing Sheets

DATABASE ACCESS

BACKGROUND OF THE INVENTION

1. Field of the Invention

The present invention relates in general to database access techniques. In particular, aspects of the invention relate to fileservers which support caching and to methods and apparatus for ensuring cache consistency.

2. Related Art

In today's information age, the ability to access rapidly data which is held in databases is of utmost importance to companies and organisations whose business may rely on the data.

The speed with which remote equipment, or a client, is able to access data on a database relies on two major factors. The first factor is the speed with which a database fileserver can read data typically from a co-located external storage device such as a hard disk drive. This factor relies on the speed of the central processing unit (CPU) and on the disk access speed of the fileserver. The second factor is the capacity, or the bandwidth, of the communications link between the client and the fileserver.

A third factor effecting database access speed, which is extremely significant to the performance of an overall system, is the loading on the system. The loading is typically proportional to the number of clients which require database access. Both the number of operations performed by the CPU and the volume of data which needs to be transmitted across communications links increases as more clients require database access. Obviously, there is a point where the demands placed on the fileserver and communications links exceed optimum capability, at which point system performance will degrade.

System performance can be improved by increasing the speed of the fileserver and the bandwidth of the communications links. However, the related costs cannot always be justified. Also, there is always a limit to the speed at which current technologies can operate.

Another way of achieving better system performance, by reducing the database CPU and communications link loading, is by using cached copies of the data. The cached copies are typically located physically nearer to the clients, or even on the client systems themselves. Indeed, this technique has been widely adopted on the Internet by using Internet fileservers containing cached copies of data located at 'mirror sites'. For example, master data accessible from a master Internet fileserver at a site in the USA might be copied, or cached, to a fileserver at a mirror site in the UK, from where a majority of European users might prefer to read the data. Thus, the data transfer overhead for transatlantic links and the demands placed on the master Internet fileserver are reduced, and the overall, perceived Internet performance is improved. In particular, the European users would expect to obtain far better data access performance by accessing the UK mirror site.

The use of cached data does raise important issues concerning data consistency. That is to say, it is sometimes difficult to know whether cached data is the same as the original, master data: the master data may change in some way after the cached copy is generated. In the case of the Internet, for example, at present a lack of consistency between master data and cached data may not be of great significance and, if it is significant, it is usually possible to choose to retrieve the master data, albeit at a slower rate, from the master database.

Cache consistency, or coherency, is however extremely important in commercial environments where the data, whether cached or master, forms the basis for making business decisions. Inconsistent data, or data which takes too long to access, inevitably results in reduced revenue. A simple example of such an environment is one for making flight bookings, where, for example, the master flight data is held in a database in the UK and travel agencies around Europe book seats on flights on the basis of cached data. In this example, under most circumstances, it is essential that the cached data is consistent with the master data.

Similar considerations are important in general in multiple-user systems, for example based on client/server or distributed database, networked environments, in which the users wherever possible rely on cached data to minimise CPU, data access, data transfer overheads imposed on master database fileservers, and overall network traffic.

In, for example, a client/server environment having multiple clients accessing a single, master database fileserver, there is typically considerable opportunity to maintain with each client a large cache of recently read data. A cache may be used during an active transaction to avoid the need to re-read data from the master database. However, if data is cached on a client and the client needs to re-access that data at a later time, unless the data in the master database cannot change, it must be assumed that the data on the cache is inconsistent, because there is no way of knowing differently. Thus, further master database access is needed to at least compare the current state of the data in the master database with the data in the cache database.

A decision whether or not to use data cacheing typically depends on the type of data to be accessed. Three common categories of data are described below.

Static data, that is data which rarely changes, are prime candidates for holding in a client cache database: the data can always be assumed to be current. However, usually a task must provided to ensure that changes to the static data are propagated to all client caches. This is typically done using an overnight batch process. For static data, there is no need for a real-time process to maintain consistency.

Highly dynamic data is extremely difficult to maintain in a consistent state. The basic reason is that if the data changes very often, the network and processor impact, in a client/server environment, of updating many client caches can be considerable. In some cases, the cost in terms of processing overhead and network bandwidth of maintaining the caches might exceed the cost of each client accessing the master database directly each time data is required. Thus, this category of data would typically not be cached.

In between static and highly dynamic data is a type of data which is not static, but which changes relatively infrequently compared with highly dynamic data. Typically, in this case, data might only be cached onto a client cache database, for example at a travel agency, during the period of an aircraft flight enquiry and seat booking operation. Then, there would be a high degree of certainty that the data remains consistent during the operation. However, there would never be total certainty because, coincidentally, another client, or travel agency, might book the only remaining seats on the respective flight between the times on which the first client started and completed its operation.

The simplest way to prevent data inconsistency, in for example the flight booking operation described above, would be to 'lock' any data on the master database which is being accessed by one client, thus making that data inaccessible, or at least only readable, to other clients for the whole period of the operation. This is called 'pessimistic locking'. Typically, a lock table, which holds the identities of locked data which cannot be accessed or written to, is generated by the master fileserver. Such a system requires that all access requests made by clients invoke a lock table search on the fileserver before data access or writing is allowed, or denied.

Obviously, however, in an environment where the same data might need to be accessed or up-dated by several clients, for example for flight-booking purposes, pessimistic locking represents an unworkable solution with intolerable locking overheads.

Another method for dealing with possible inconsistency between cached and master data is discussed in the book "Transaction Processing—Concepts and Techniques" by Gray J and Reuter A, published by Morgan Kaufmann 1993, on pages 434 to 435. The method involves 'optimistic locking'.

Optimistic locking allows clients connected to a fileserver to use cached data at any time for reading purposes, but as soon as a transaction is initiated, for example making a flight seat booking, the cached data is compared with the master data to ensure data consistency and the master data is locked only for the period of the actual transaction (in this example, the transaction is the actual database access and write procedure). This prevents another client from changing the master data during the transaction. If, after the transaction has been initiated, the data in the cache database is found to be inconsistent with the corresponding data in the master database, the cache database is updated with the latest master data, and the client is notified and left to resolve any problems the inconsistency might have caused.

The advantage of optimistic locking is that the master data is only locked for a very short period of time, for maybe less than one second, to carry out the actual transaction. In contrast, pessimistic locking requires the data accessed to be locked for the whole period of an operation, for example for the whole period of an enquiry and a transaction, which might take many minutes.

Although optimistic locking may therefore require extra processing by both a client and a fileserver, it can be seen that the technique is far better suited for dealing with relatively dynamic data which may need to be accessed by multiple clients.

When implementing optimistic locking, it is known sometimes to use time stamping to mark data rows in the master database with the time the data was last updated. In this way, if the time-stamp for a particular row of data held in a cache is the same as the row in the master database, the fileserver accepts that the cached data is current and there is no need to re-send the data row in question across the network to the client. Thus, network bandwidth is conserved whenever a cached copy is found to be current.

SUMMARY OF THE INVENTION

In accordance with a first aspect, the present invention provides a method for checking the consistency of an item of data in a cache database with a respective item of data in a master database by comparing a first key stored in association with the item of data in the cache database with a second key stored in association with an index entry for the respective item of data in the master database.

In accordance with a second aspect, the present invention provides a method for retrieving an item of data from one of a cache or a master database, the master database comprising a plurality of items of master data and an index containing entries corresponding to one or more of the items of master data, the cache database containing a cached copy of at least one item of the master data, the method comprising the steps of:
   reading a first key stored in association with a cached copy of a required item of data from the cache database;
   reading a second key stored in association with an index entry for a respective item of master data from the master database;
   comparing the first key with the second key; and
   retrieving in the event the first and second keys are the same the cached copy of the item of data or in the event the first and second keys are different the respective item of master data.

In accordance with a third aspect, the present invention provides a database fileserver apparatus comprising:
   input means for receiving a conditional read request for an item of data stored in the database, the request including a first key from a previously-retrieved copy of the item of data;
   means for accessing an index of the database and reading an index entry for the requested item of data, the index entry including a second key for the stored item of information;
   means for comparing the first and second keys; and
   means if the keys are the same for returning an indication that the previously-retrieved copy of the item of data is consistent or if the keys are different for reading from the database and returning a copy of the item of data.

In accordance with a fourth aspect, the present invention provides a database index, wherein at least one index entry in the index includes at least:
   identity information for identifying an item of data in the database;
   location information for indicating the location in the database of the item of data; and
   version information which changes each time the respective data in the database changes.

Embodiments of the invention are particularly suited for use in a multiple-user computing environment, for example a client/server environment.

A key, or version information, preferably comprises a time-stamp which relates to the last time its respective data was up-dated. Alternatively, however, a key might be some other indicator which changes each time the respective data changes. For example, a key might comprise a version number, generated by an incremental counter, which is incremented whenever the respective data is amended.

Advantageously, having keys associated with entries in the index of the master database obviates the need to read the actual master data. Hitherto, use of keys such as time stamps has been limited to associating keys with actual master data, and not with the index entries therefor. Regardless of whether the keys were the same, therefore, the data would have needed to be read from the master database for the purposes of comparison.

In some embodiments, the master database is stored both in an external storage device and in main memory of a fileserver.

BRIEF DESCRIPTION OF THE DRAWINGS

Embodiments of the invention will now be described, by way of example only, with reference to the accompanying drawings, of which.

DETAILED DESCRIPTION OF EXEMPLARY EMBODIMENTS

Figure 1:
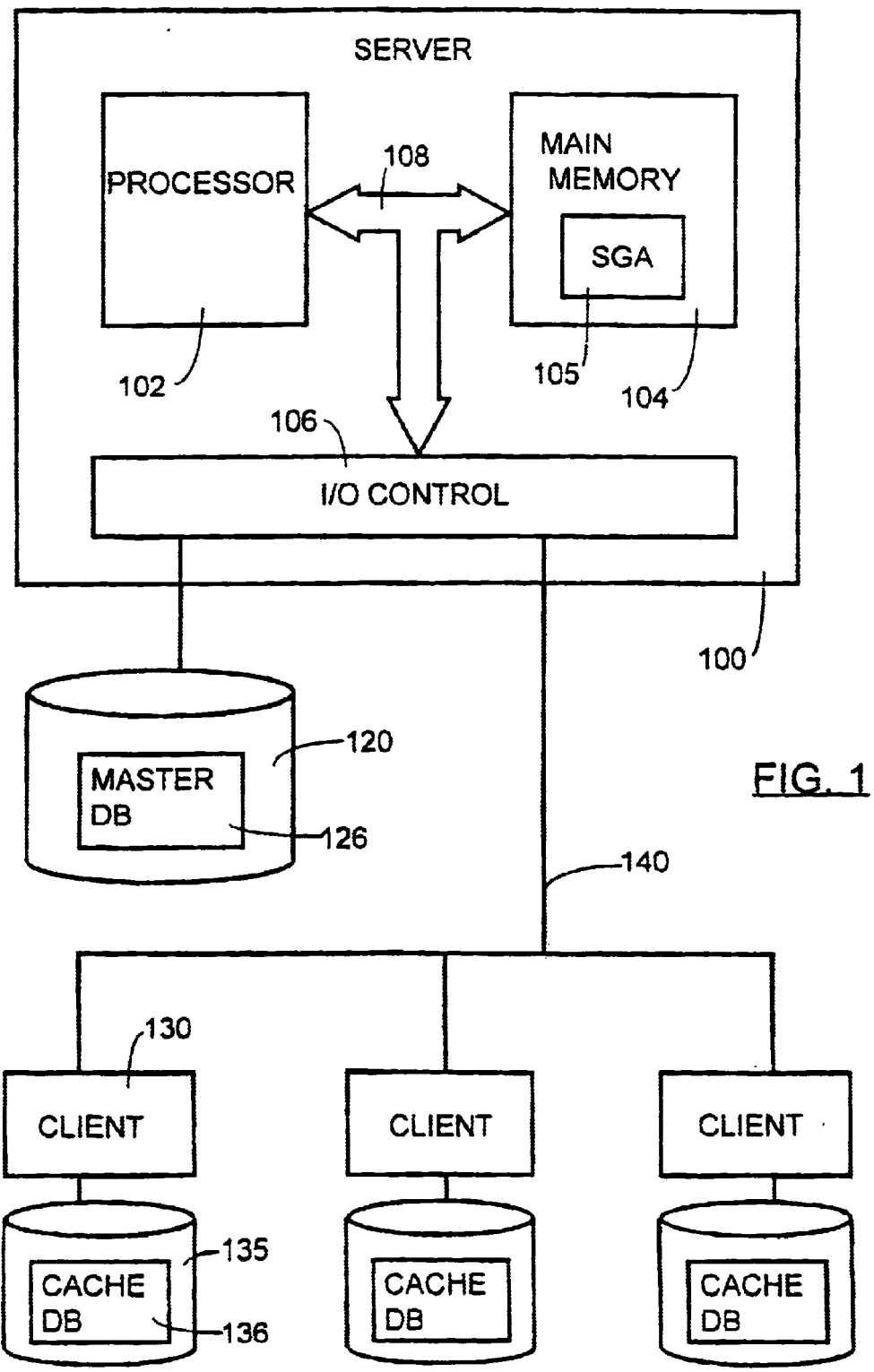
FIG. 1 is a block diagram of an exemplary, two-tier client/server computing environment suitable for implementing an embodiment of the present invention.

FIG. 1 illustrates an exemplary, two-tier client/server computer environment in which an embodiment of the present invention may be implemented.

A fileserver 100, for example a computing platform running the UNIX operating system, runs network and database management system (DBMS) software suitable for providing remote database access to a plurality of clients 130 over a network 140. In this description, unless otherwise stated, the term "client" will be used to describe both the physical computer 130 connected to the network 140 and an operator of the computer. In a local area network environment, a suitable network might be an Ethernet network running TCP/IP software, and suitable DBMS software might be Oracle version 7. DBMS software allows creation and control of complex database systems and access to the data therein via appropriate structured query language (SQL) calls. For further information on such systems, the reader is referred to the numerous texts and reference manuals on database systems which are widely available.

The fileserver 100 comprises standard computer components such as a processor 102, main memory 104 and input/output (I/O) hardware 106, all connected by suitable data and address buses 108. The fileserver supports, typically, a large capacity (for example 10 Gbytes) external storage device such as a hard disk 120, on which substantially all the information in a master database is stored.

The main memory 104 of the fileserver is split into areas for standard program and data storage. Also, for the example of running Oracle database software, the main memory includes a large area of memory known as a system global area (SGA) 105, the purpose of which will be explained below. In this description, the terms "fileserver", "database" and "DBMS" may be used interchangeably and all refer, in general, to a master data storage system to which clients have data access.

The clients 130 are standard computer systems, for example IBM Personal computers, each including a standard hard disk drive 135 having around 100 Mbytes of storage capacity. The clients 130 run software, for example in a Microsoft Windows environment, suitable for accessing (reading and writing) data stored in a database using SQL queries which are interpreted and processed by the DBMS software. The hard disk drives 135 have a storage area for a cache database 136, into which data from the master database 126 can be copied and accessed as required.

Figure 2:
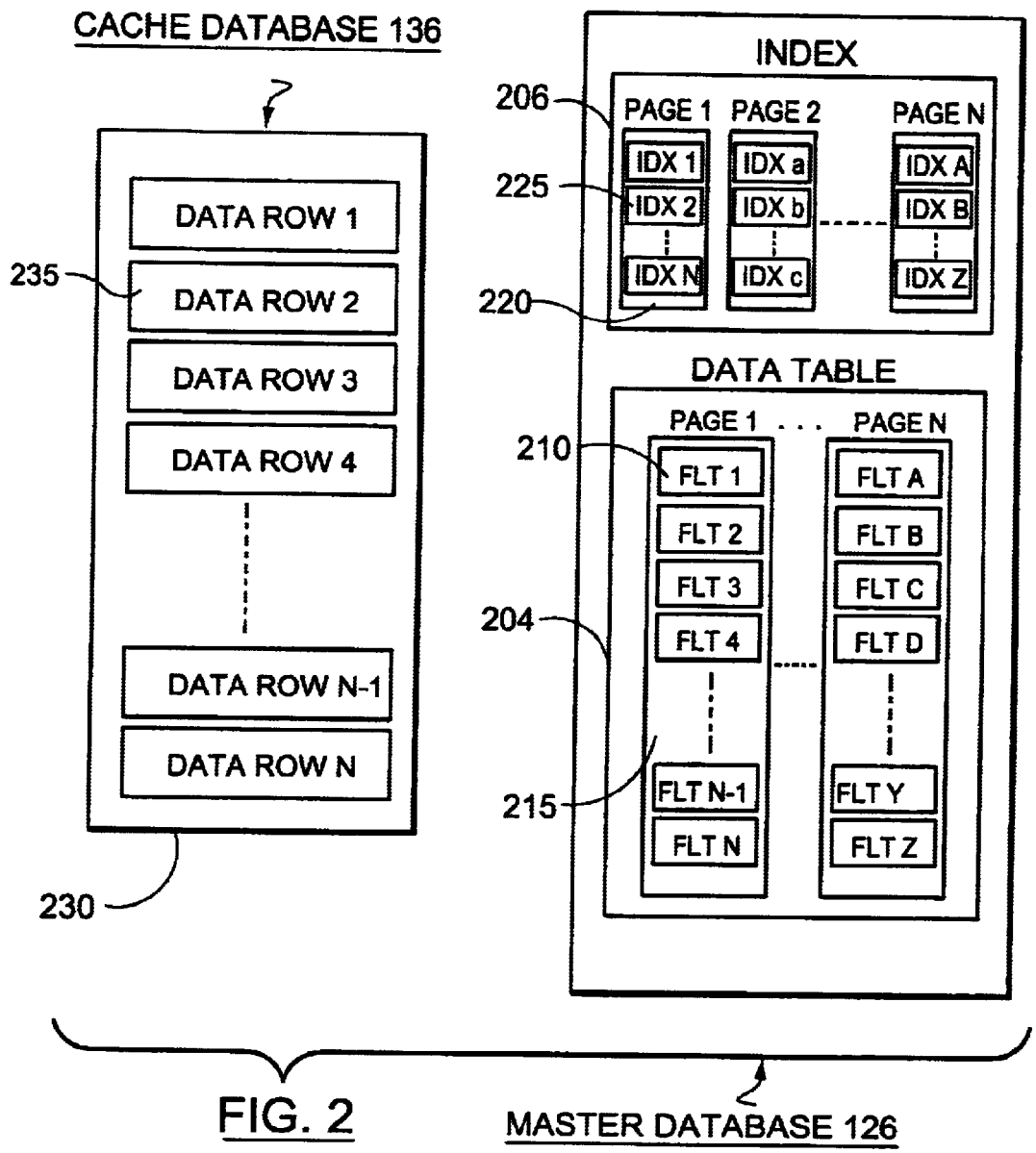
FIG. 2 is a diagram which represents a typical data structure for a database system.
Figure 3A:
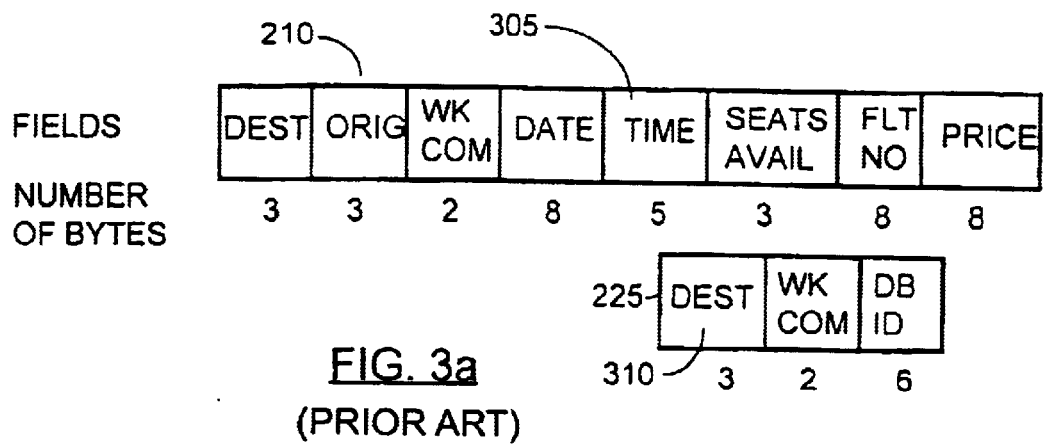
FIGS. 3a to 3c are diagrammatic representations of the row and index structures of a database for two prior art systems and for an embodiment of the present invention respectively.

As illustrated in FIG. 2, typically, the master database 126 comprises two main physical areas. The first area holds the data table 204, where the database data is stored. A data table 204 typically comprises a group of related data. For example, a table 204 may hold the information about all scheduled aircraft passenger flights around Europe in the coming year. A table is split up into pages 215, or blocks, comprising rows of data, where, in this example, one row 210 would represent one particular flight. The data about each flight would be held in fields 305, or columns (as illustrated in FIG. 3a), within each row 210. Example fields 305 for a particular flight might include:

| | |
|---|---|
| destination | 3 bytes |
| origin | 3 bytes |
| in week commencing | 2 bytes |
| date | 8 bytes |
| time | 5 bytes |
| seat availability | 3 bytes |
| flight number | 8 bytes |
| price per seat | 8 bytes |
| total | 120 bytes |

The second area in the database is the index 206 comprising index pages 220. The index pages 220 contain index entries 225 for each row 210 in the data table 204. An index 225 typically comprises index fields, one of which references a specific row of data in the data table 215. In the case of Oracle, the indexes are usually arranged (internally) as a B-Tree (binary tree) to make index searching faster. The mechanisms employed for B-Tree searches are widely known but are beyond the scope of the present description. Thus, for convenience and ease of description only, the indexes will be treated as simple sub-sets of the data tables.

As illustrated in FIG. 3a, an index 225 includes a first index field 310, for example containing a destination, a second index field 311, for example containing an in week commencing value, and a third index field 312 which is a pointer to where the corresponding data row 210 is held in the data table 204. In this example, therefore, flights can be searched by destination and in a particular week of the year. An example search query might specify all flights to Paris in the 25th week of the current year. The DBMS, in response, would search the index for all flights to Paris in the week commencing 10 Dec. 1995 and return the corresponding rows to the requesting client. Obviously, other search criteria, for example by specific date, would require an index to have a specific data field instead of a week commencing field. In general, there typically needs to be a different index for each different potential search criteria.

The cache database 136 comprises a storage area 230 for cached data. The cached data typically comprises data rows 235 copied from the master database 126. The rows 235 themselves are typically exact copies of the rows 210 in the data table 204, although this need not be the case. Thus, the row configuration illustrated in FIG. 3a is common to both the cache and the master database data rows.

The cache database 136 may or may not have a corresponding index, depending on the size and acceptable access speed of the cache database. For the present purposes, it will be assumed that the cache database has no index and is therefore searched by sequential access.

The SGA memory 105 on the fileserver 100 is located predominantly, or preferably wholly in a well-tuned system, in main memory 104. The SGA 105 is a form of internal cache used by Oracle to speed up master database access for clients 130. The existence and operation of the SGA 105 is typically invisible to users or clients of the system. DBMSs other than Oracle implement similar schemes.

Whenever a client requests an item of data, the fileserver 100 looks initially in the SGA 105, then in the master database 126, for the respective index entry and then looks in the SGA, followed by the master database, for a copy of the data row or rows. If either the index entry or the respective master data is not present in the SGA 105, the fileserver accesses the master database 126 and copies the index entry or the data to the SGA 105. When a row needs to be copied from the master database 126 to the SGA 105, in fact, the whole page, or block, containing that row is copied to the SGA 105. From there, any access of the required row or rows is made via the SGA 105. In this way, over time, the most commonly accessed and/or dynamic data tends to reside in the SGA 105 and, since access to main memory 104 can be in excess of an order of magnitude faster than hard disk 120 access, the overall average access time for the database is reduced. In the present example, for ease of description only, it will be assumed that only specific rows are cached, rather than pages.

Presently, main memory is limited in capacity by far more than external storage capacity. Therefore, the SGA 105 tends only to contain the most recently-used data. Also, since main memory 104 tends to comprise RAM, which is volatile, the database needs to be updated regularly (for example on a daily basis) with any changes to data held in the SGA 105. In effect, the SGA 105 forms an integral part of the master database and acts in a similar way to a 'write back' cache insofar as up-dated data is periodically written back to the master database on the disk drive 120.

As has already been stated, typically, a cache database 136 has a cache table arranged to hold data rows 235 which are copies of the respective data rows from the master database 126.

For ease of understanding, in the following description, data access or write denial, due to the existence of a lock (which are described in brief above), are not considered. It should be remembered, however, that in practice a lock might prevent a desired data access on the fileserver and that the DBMS usually deals with such a situation in an appropriate manner, for example by freezing the operation of the denied client until the lock is removed.

The two main transactions carried out by a client in a database environment are 'read' data and 'up-date', or 'write', data: create or write data will for the present purposes be treated in the same way as up-date data. A combination of read and write typically forms the basis for client/server database transactions.

Figure 4:
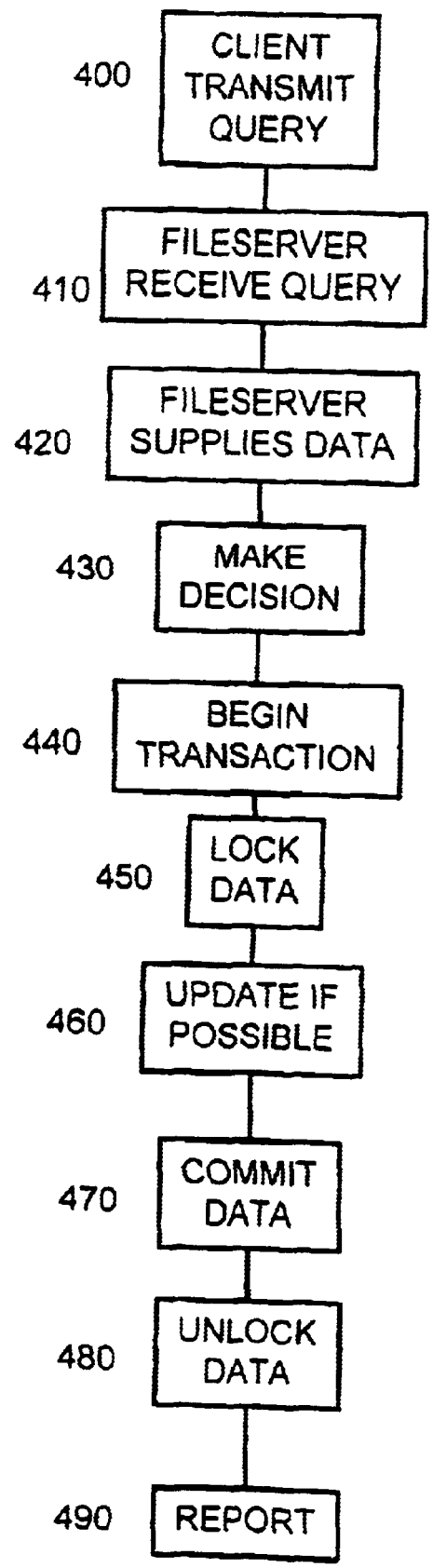
FIG. 4 is a flow chart representing a typical database transaction.

An example of a basic database operation, ignoring data cacheing, is illustrated in the flow chart in FIG. 4.

In FIG. 4, a client 130 transmits a query, in step 400, to read data from the master database 126. In step 410, the fileserver 100 receives the query. The fileserver 100 returns the information, in step 420, to the client 130. The client then, in step 430, makes a decision on the basis of the data that has been returned. An example of a decision might be which flight to book, from a number of available flights to Paris, on the basis of price. In step 440, a transaction is initiated by the client 130 to book a seat on a specific flight by transmitting the appropriate data to the fileserver 100. The data might include, for example, customer details of the person who wishes to book the seat on the flight to Paris and a write request to reduce seat availability on that flight accordingly. On receipt of the data, in step 450, the fileserver 100 searches for and locks the data to be up-dated, by creating an entry in a lock table. Then, in step 460, the fileserver 100, if possible, up-dates the flight data, which is read from a data table. In step 470, the fileserver 100 commits the up-dated flight data and the new customer data to respective data tables in the database. The data is unlocked by removing the lock table entry, in step 480, to allow access by other clients to the data. Finally, in step 490, the fileserver 100 transmits a status response to the client that the transaction has been successful.

Figure 5:
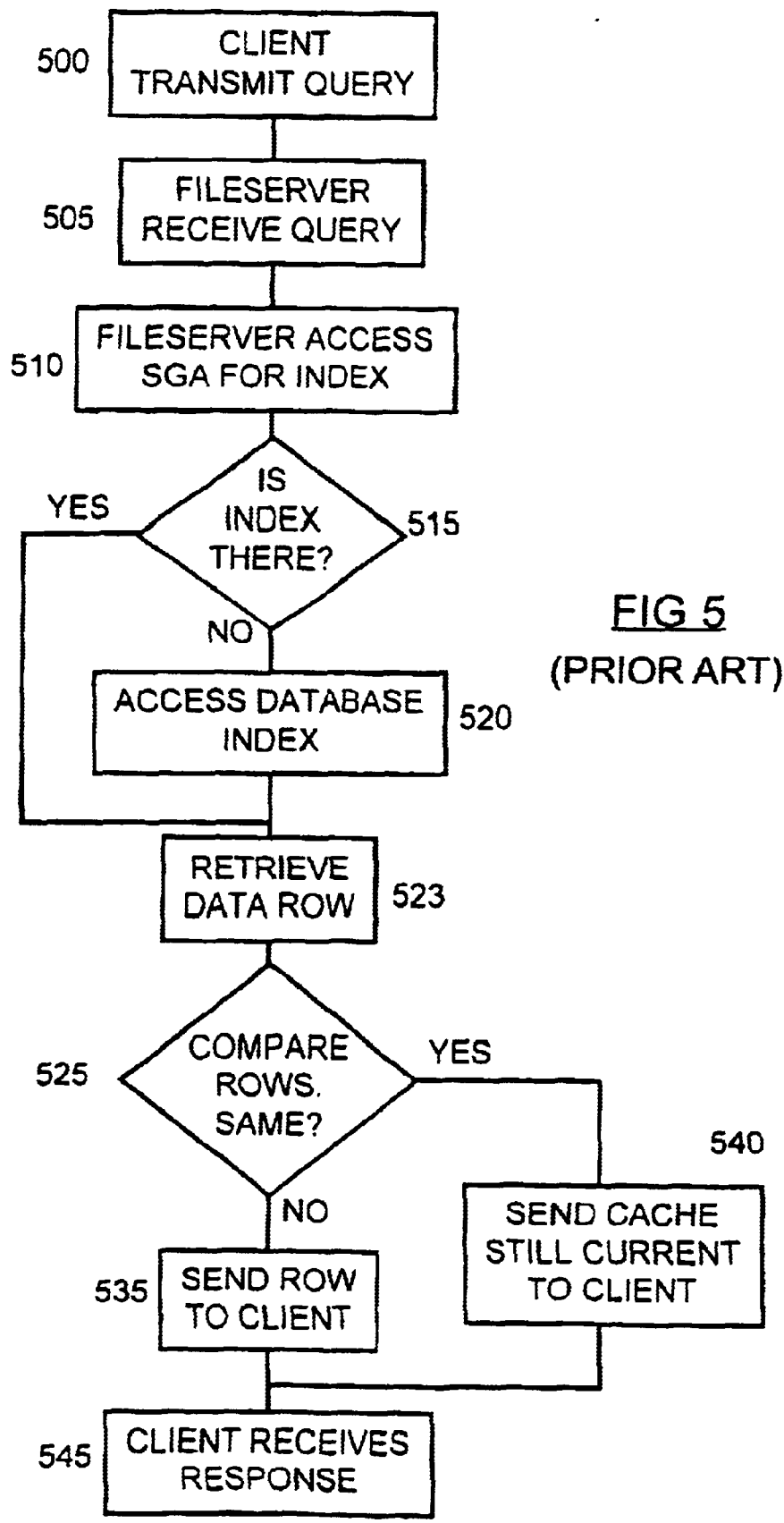
FIG. 5 is a flow chart which represents a typical database read process.
Figure 6:
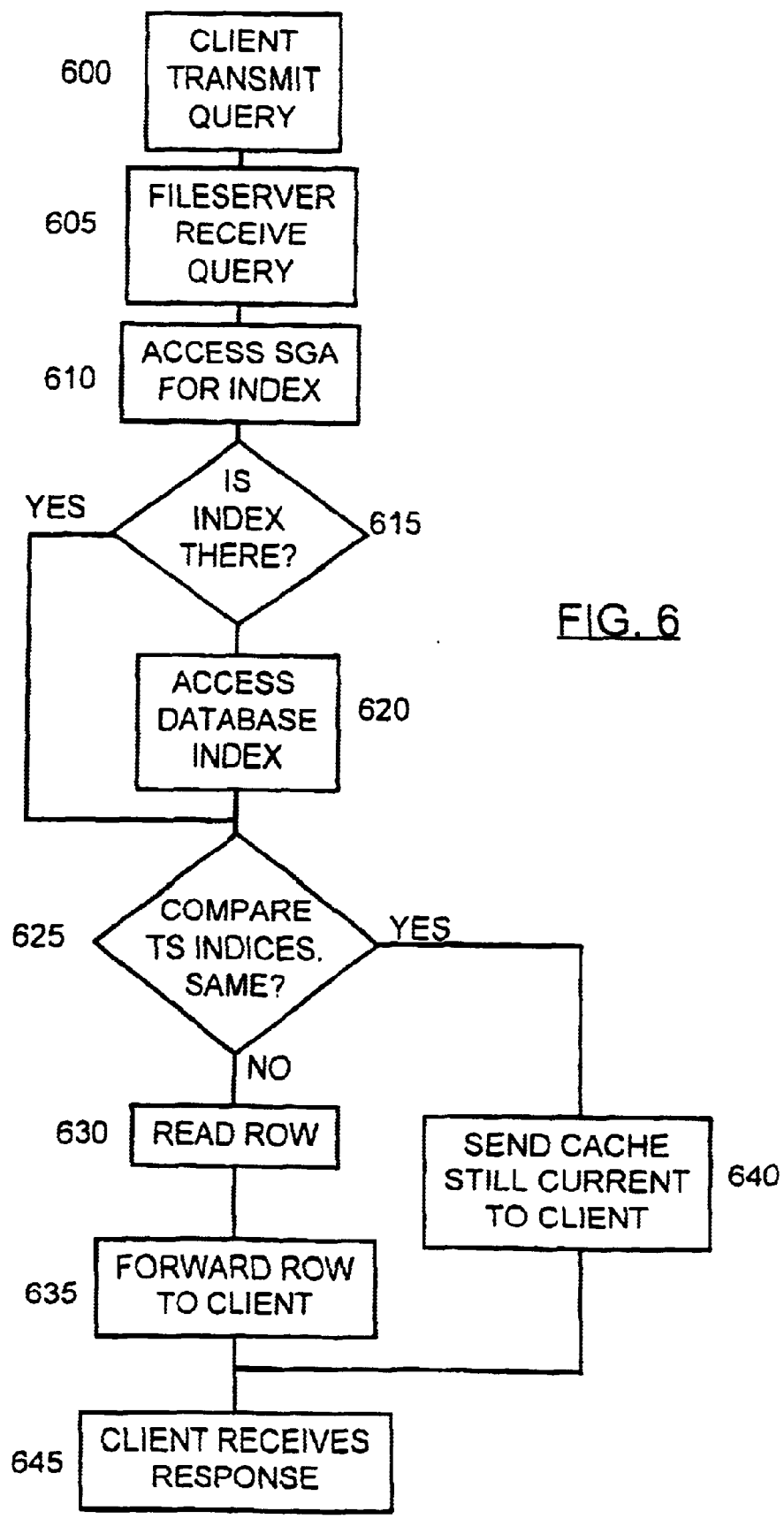
FIG. 6 is a flow chart which represents a database read process modified in line with an embodiment of the present invention.

FIGS. 5 and 6 illustrate in flow chart form respective database read procedures, taking account of database cacheing, stimulated by a suitable read query for systems operating without and with a time stamp in the index entries respectively. In both examples, only one data row is requested but it will be appreciated that queries for multiple rows are a possibility. Also, it is assumed that a cache copy of the data already exists in the cache database 136 and that both cache copies of data and master copies of data include time stamps which reflect the last up-date time for the respective data.

Figure 3B:
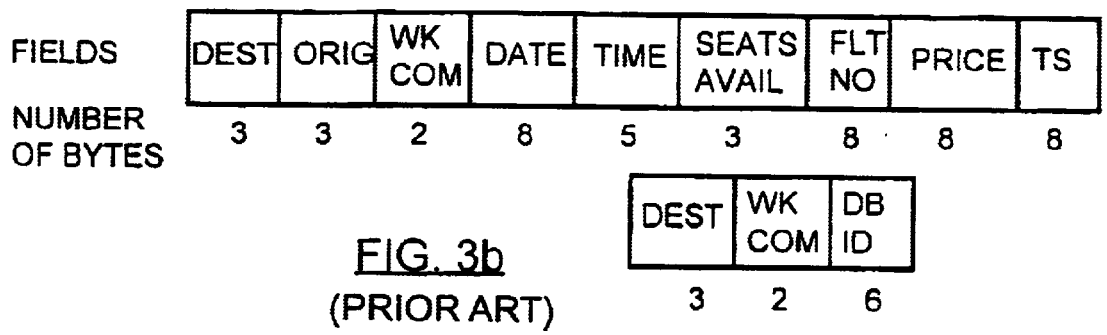

The following description of the process illustrated in FIG. 5 assumes that the data rows and index entries have the structure shown in FIG. 3b.

In FIG. 5, in step 500, the client 130 transmits a query, across the network 140 to the fileserver 100, to read data from the fileserver. The query includes an identifier for the data row required and a respective time stamp. In step 505, the fileserver 100 receives the query. The fileserver 100, in step 510, accesses the SGA 105 in search of the index 225 for the data in question and retrieves the index if it is present. In step 515, if the index 225 is present in the SGA 105 then, on the basis of the index value, the fileserver 100 accesses the data table 204 of the master database 126 to retrieve the data page 215 (which may be in the SGA or on the external storage device) containing the row 210, in a step 523. On the other hand, if the index 225 is not present in the SGA 105, then, in step 520, the fileserver 100 accesses the index 220 on the external storage device and copies the index entry to the SGA 105. Then, in step 523, the fileserver 100 accesses the respective data page 215 of the master database 126 to retrieve the data. At every stage, any data accessed which is not in the SGA 105 is copied to the SGA. In step 525, the fileserver 100 compares the time stamps of the cached data row with the master data row requested. If the time stamps are the same, the fileserver 100, in step 540, sends a reply to the client 130 that the cached data is still valid, or, in step 535, if the time stamps are different, the fileserver 100 transmits the entire data row 210 (or only the requested columns of the data row) to the client 130 to update the cache database 136. In step 545, the client receives the response and acts accordingly.

Figure 3C:
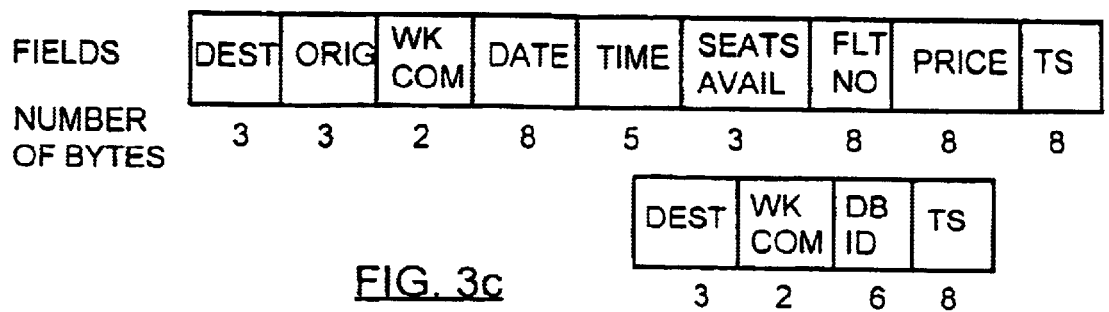

The following description of the process illustrated in FIG. 6 assumes that the data rows and index entries have the structure shown in FIG. 3c.

In FIG. 6, steps 600 to 620 are equivalent to steps 500 to 520 in FIG. 5. In step 625, the fileserver 100 compares the time stamp in the index entry with that of the query. If the time stamps are the same, in step 640 the fileserver 100 transmits a message to the client 130 that the cache copy is still valid. On the other hand, if the time stamps are not the same, the fileserver 100 accesses the master database 126, in step 630, to retrieve the current data row. The current data row is then returned to the client 130 to update the cache database 136 in step 635. In step 645, the client 130 receives whatever data is returned by the fileserver 100 and acts accordingly.

The advantages and disadvantages of the method and database arrangement of the invention can be appreciated by comparing the flow charts in FIGS. 5 and 6, and by considering the field lengths shown in FIGS. 3a to 3c.

Obviously, using the row configuration illustrated in FIG. 3a has the disadvantage that potentially a whole row of data would need to be passed from the client 130 to the fileserver 100 to check for data consistency. However, using the configuration of 3b, there is only a requirement to transmit a reference indicating the required row, and time stamp. Thus, in theory, the transmission overhead between FIGS. 3a and 3b is cut by 107 bytes (that is the difference between a whole row of 120 bytes and a reference, comprising a destination field of 3 bytes, a week commencing field of 2 bytes and a time stamp field of 8 bytes ie. 120−13=102 bytes). With reference to FIGS. 5 and 6 which use the data configurations of FIGS. 3b and 3c respectively, initially the transmission overhead from the client 130 to the fileserver is the same. That is, the steps 500 to 520 and steps 600 to 620 are equivalent. The first difference is between steps 525 and 625. In step 525, the fileserver 100 reads the whole data page containing the required data row from the data table 204 to enable comparison of the data row 210 time stamp with the time stamp in the query. Therefore, in FIG. 5, the fileserver 100 must read the whole page containing the required row to enable a comparison of the time stamps.

In contrast, in step 625, the fileserver 100 compares the query time stamp with the index entry time stamp. The fileserver 100 only needs to read the whole data page containing the row in the event the time stamps are different. Consequently, external storage device 120 access is generally not required if the time stamps are the same and the index entries in question are in the SGA 105. Therefore, in theory, the database access times and the processing overhead of the fileserver 100 can be reduced and the response times for clients 130 can be reduced.

A disadvantage of the proposed method is the increased size required by the index. By considering the index arrangements of FIGS. 3b and 3c, it can be seen that there is about a 70% increase in index size. Therefore, theoretically, the index size will increase by nearly 70% and the search time might increase proportionally. However, in practice, indexes are more complex and typically include many more index entries to allow more flexible query options. For example, a typical index might allow rows to be searched on date and flight number as well as destination and week commencing. Thus, the addition of a time stamp might not incur such a large overhead. In general, it can be seen that the overhead of adding a time stamp to the index depends on the size and complexity of the index.

In some embodiments, it is only necessary to add time stamps to index entries for data which is classed as dynamic, such as, for example, flight seat availability. Whereas, it would not be necessary to add time stamps to index entries for static data such as, for example, flight number and departure date data. In this way, the time stamp overhead in the index may be reduced. Obviously, the SQL software and the DBMS would then need to deal with both possibilities.

While the example of using time stamps has been explained in detail, it will be appreciated that other methods for marking data rows to enable data consistency comparisons are possible. For example, an incremental counter field might be used instead of a time stamp. Each time a data row is amended, the count value in the field would be incremented by a process on the fileserver. Thus a comparison between the increment value of a cache data row and the increment value for an index entry for the master data row would highlight any changes to the master data row, and thus any inconsistencies with the cache database row. Other comparable methods of identifying inconsistent data, for example using coding to produce unique codes representative of the specific state of a row, will be apparent to the skilled addressee on reading this description.

In some embodiments of the invention, the SGA 105 is large enough to contain, at least, the whole index 206 permanently. This is highly desirable since all index accesses for reading or writing use only main memory 104 access and never have to access the index 220 in the external storage device 120. It is envisaged that this will become common practice in future when memory becomes cheaper and SGA sizes increase. Time stamping of index entries which are all held in an area of the SGA will therefore increase efficiency even more.

In any database system which allows data to be amended by a client, it is important for other clients to be able to access the updated data, if necessary, for carrying out a transaction. This would certainly be the case in the flight-booking scenario described above. In some scenarios, however, obtaining a current data value is not so important. This might be the case, for example, in a supermarket using point-of-sate (POS) terminals, or tills, which log all product sales to a database in the supermarket to facilitate automatic stock monitoring and ordering. In this case, each time a can of beans is sold the till logs the sale to the database, which acts as a cache database to a master database at the supermarket chain's headquarters. It would not be important for each till to have knowledge of the number of cans of beans remaining in the supermarket or indeed the number of cans of beans stocked by the supermarket chain. Therefore, up-to-date data consistency between the cache database and the headquarters master database would be unnecessary. All data could be written back (from the cache database to the master database) on a daily basis, which would be adequate to accommodate stock control for the supermarket chain.

For the present purposes, however, substantially only systems requiring consistent data, for example flight booking systems, will be considered in connection with up-dating data.

One solution for ensuring data consistency is to pass all changes back to the master database immediately they are made. The data up-dating process is explained below in conjunction with the flow chart in FIG. 7.

Figure 7:
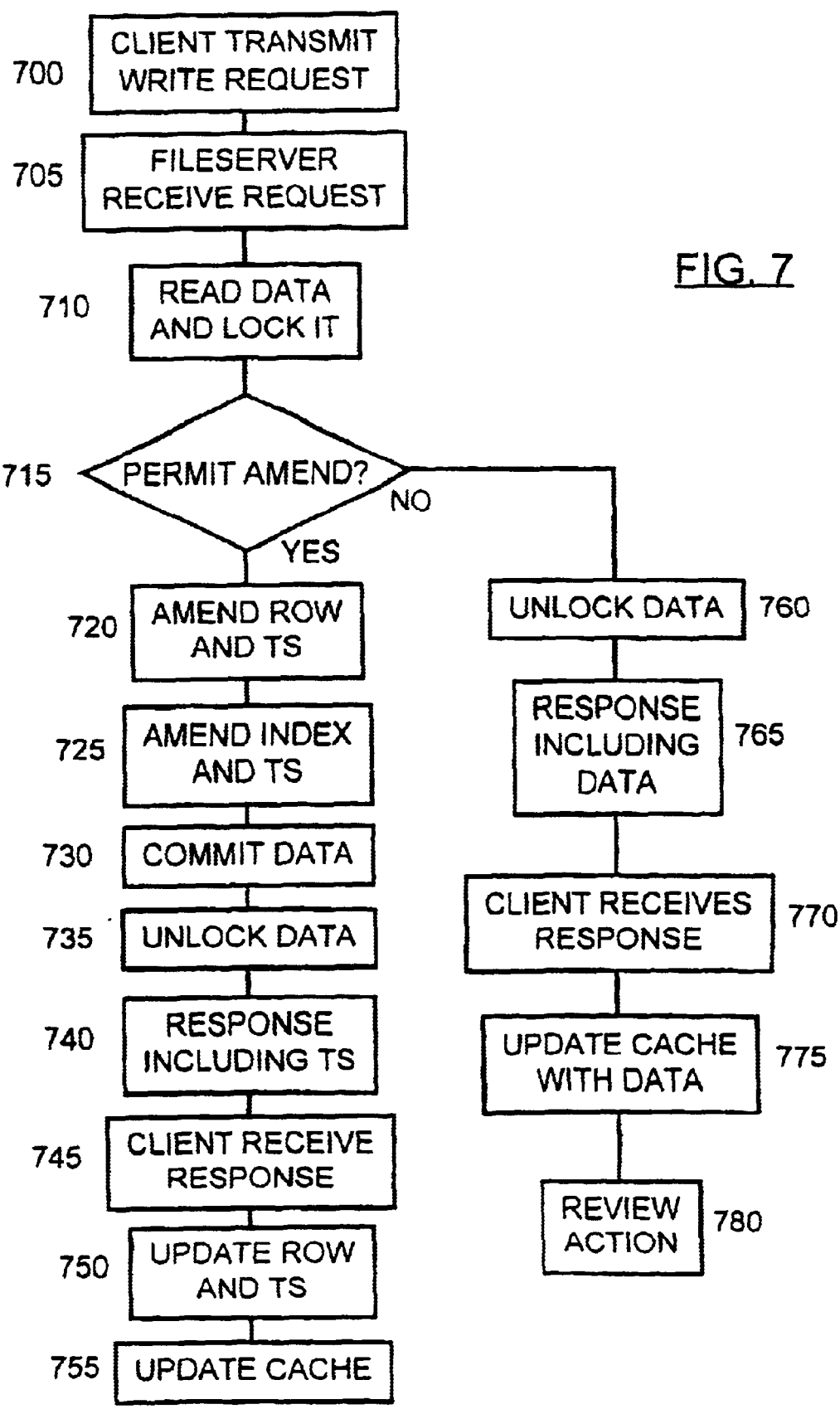
FIG. 7 is a flow chart which represents a database write process.

According to FIG. 7, in step 700 the client 130 transmits a write request to the fileserver 100 to up-date a specific data row. The request includes a copy of the new, up-dated row, and the time stamp of a previously-cached copy of the row. The fileserver 100 receives the request in step 705. In step 710, the fileserver 100 locks the data row in question from access by other clients by placing an entry for the row in a lock table. Then, in step 715, the fileserver 100 compares the index entry time stamp for the specified row with the time stamp in the request. If the time stamps are the same then the master data row can be over-written with the up-dated version of the row, since clearly no changes have occurred to the master data row since the original cached copy was made. If, on the other hand, the time stamps are different, then usually the master data row cannot be over-written because clearly the master data row has changed since the original cached copy was made and, accordingly, the up-dates to the cached data row were made on the basis of inconsistent data.

In some cases, however, it is still valid to over-write the master data with the updated data even if the time stamps are different. One example of when an up-date would be possible, even if the cached data was not current, is if a client wants to book four seats on a flight, the cache database 136 reports that 100 seats are available but the master database 126 reports that only 90 seats are available: even though the cached data is inconsistent, the transaction is still possible. If, however, a client wants to book ten seats on a flight, the cache database 136 reports that twelve are available but the master database 126 reports that only three seats remain, then the transaction cannot be completed. The DBMS software would in practice carry out a test to see whether a transaction is possible or not.

If in step 715, the fileserver 100 determines that the master data row can validly be over-written, in step 720 the row is over-written and a new time stamp for the row is generated and incorporated. Then, in step 725, the time stamp in the corresponding index is amended to the same value. In step 730, the amended row and index are committed to the SGA 105 of the master database (periodically, or when the SGA 105 becomes full, the new master data rows and index entries are written back to the external storage device 120). In step 735, the data row is unlocked by removing the lock table entry to make it available for access by other clients. The fileserver 100 then, in step 740, transmits a response to the client to acknowledge that the transaction has been completed. The response includes a time stamp value which matches the duly assigned time stamp of the amended row and index. The client, in step 745, receives the response, and in step 750 amends the row and updates the row time stamp with the new time stamp. In step 755, the client 130 writes the row to the cache database 136.

If in step 715 the required amendment cannot be made, in step 760, the fileserver 100 unlocks the row and transmits, in step 765, a suitable response to the client 130. A copy of the current master row is included in the response. In step 770, the client receives the response and, in step 775, updates the cache database 136 with the current row. In step 780, the client is left with the task of handling the discrepancy.

The write procedure described above ensures that all clients 130 are able to access current data if necessary. However, the procedure does incur an extra processing overhead on the fileserver 100 above that which would normally be required in a prior art system. The extra overhead is in step 725 in which the fileserver 100 has to write to the index 220 to update the index time stamp: normally, the index 220 is only written to if the row data in the data table 215 is re-arranged for some reason, for example a new record is created or an old record is deleted.

It is envisaged, however, that as SGAs increase in size and more index entries are stored in SGAs, this overhead will decrease in significance.

In some embodiments, rows of data may be arranged into a set which is stored in one or more pages of a database. This might be the case if a client commonly deals with several rows of data at the same time on a regular basis. Then, the client defines a single query which reads the set of rows, rather than requiring a separate query for each row each time. The fileserver 100 has a matching set definition to support this facility. Each row in the set has its own time stamp. Thus, the overall time stamp of the set can be taken to be the latest time stamp of any row in the set. In this way, the database system need only compare set time stamps instead of the time stamps of each row to determine if the data is current. This raises the problem, however, that if another client deletes a row which is included in the set of another client, no latest time stamp is registered: the row is removed so there is nowhere for the time stamp to go. Therefore, the set time stamp remains the same even though the set has been amended (by deletion).

One solution to this problem is to use some form of cyclic redundancy check (CRC) algorithm to ensure that the CRC of some property of the rows in the set or the index entries to the rows in the set is unchanged. The code could be incorporated into the time stamp field itself, or into a specific field. For example, a 32-bit CRC check would give a 1 in 4,294,967,296 chance of an undetected error.

So far in this description the invention has been described in relation to a, so-called, two-tier computing environment in which a plurality of clients have access to a master database. The present invention is, however, not limited in any sense to use on such a system. For example, the present invention can be implemented on multi-tier systems. One such multi-tier system is shown in FIG. 8.

Figure 8:
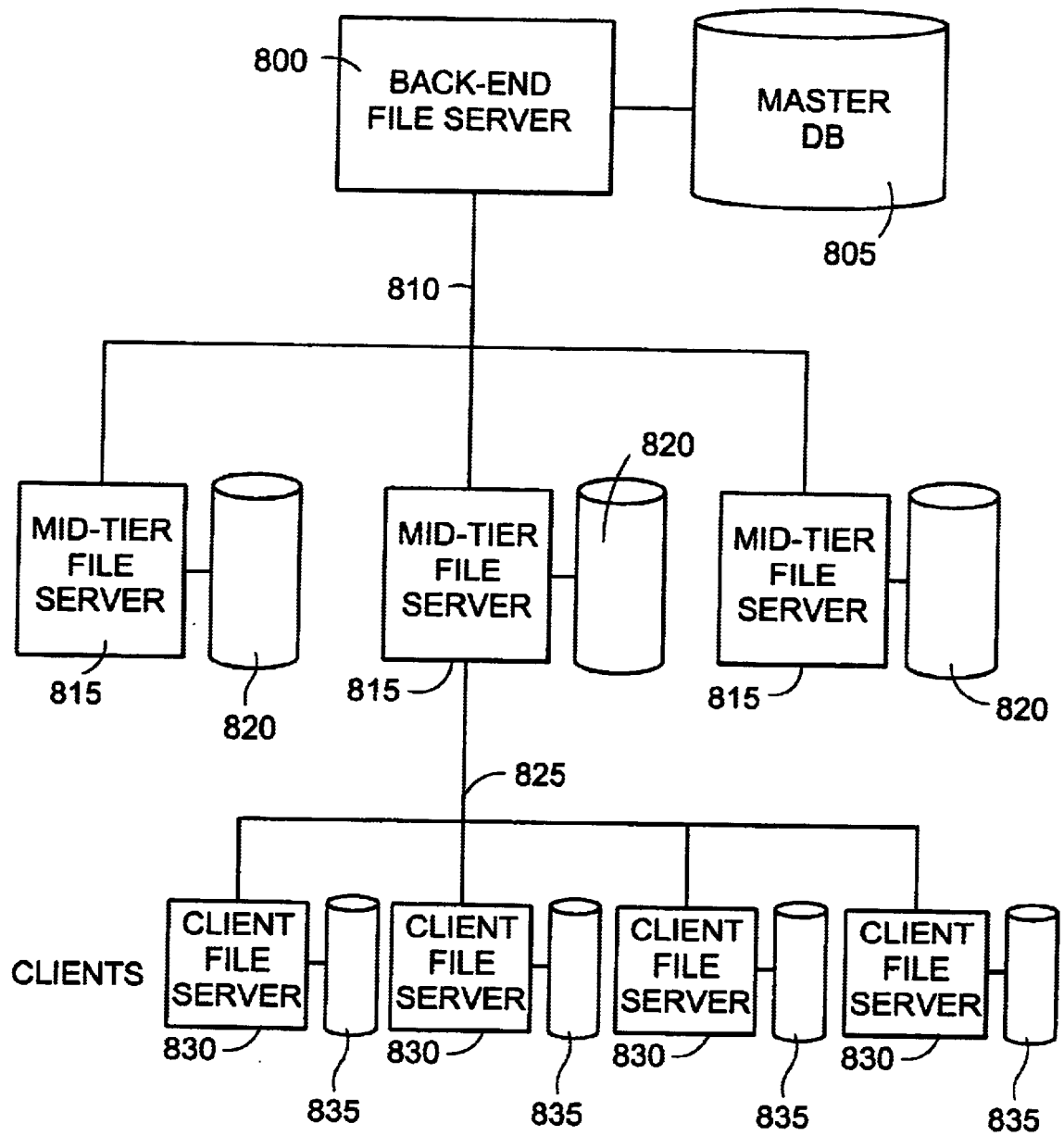
FIG. 8 is a diagram representing a three-tier architecture on which an embodiment of the present invention can be implemented.

In FIG. 8, a back-end fileserver 800 supports a master database on a hard disk drive 805. The fileserver 800 is equivalent in operation to the fileserver 100 in FIG. 1. The fileserver might be an IBM mainframe computer. The back-end fileserver 800 is connected by a network 810 to mid-tier fileservers 815 which each have a hard disk drive 820 which includes a storage area for a cache database. The mid-tier fileservers might be UNIX-based computing platforms. The network 810 is an international network comprising private circuit connections supporting an ATM protocol. The mid-tier fileservers 815 operate, in relation to the back-end database 800, in a similar fashion to the clients 130 of FIG. 1.

To each mid-tier fileserver 815 there is or are attached, via suitable networks 825, one or more client servers 830 and associated memory (e.g., disk drives 835). Suitable networks might comprise national networks such as, for example, a packet-switched data network. A client might be, for example, an IBM-compatible PC.

In this example, the clients 830 have access to the data in the back-end fileserver 800 via the mid-tier fileservers 815. The clients 830 are unaware of the relationship between the mid-tier 815 and the back-end 800 fileservers: the relationship is said to be transparent to the clients.

An example of when such a system might be implemented is for an international company with local main offices in London (mid-tier fileserver A) and Hong Kong (mid-tier fileserver B) and a head office in Munich (mid-tier fileserver C and back-end fileserver 800). The clients 830 are based in respective regional offices which are connected to the local main offices via the national network 825.

In this example, the company's master database would be held on the back-end fileserver 800 at the head-office. Thus, access by the clients 830 to static data would be direct from the mid-tier fileserver 820 cache databases, onto which the necessary data is up-loaded regularly (for example, on a daily basis), or when required. Access to the more dynamic data would be from the back-end fileserver 800, via the mid-tier fileservers 815, using the reading and writing processes described in relation to FIGS. 6 and 7 respectively. Thus, international direct access by the clients 830 to the back-end fileserver 800 is restricted to that required to carry out transactions based critically on dynamic data. Again, a flight booking is a good example of such a transaction.

Figure 9:
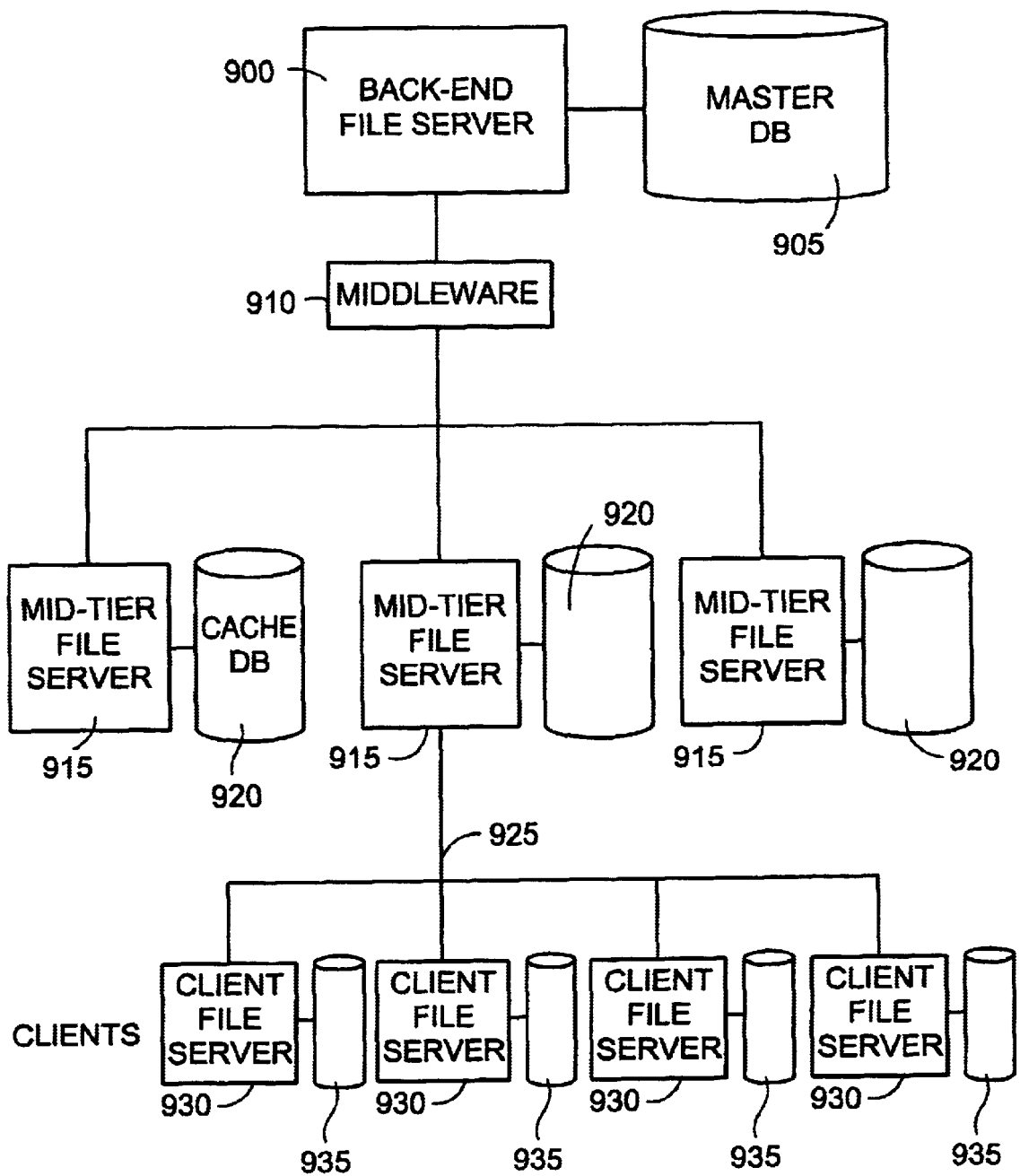
FIG. 9 is an alternative arrangement to FIG. 8.

Another possible system on which the present invention may be implemented is that illustrated in FIG. 9.

The arrangement illustrated in FIG. 9 is variation on FIG. 8. The difference is the inclusion of a middleware system 910. The middleware system 910 is, in effect, an interface between the back-end fileserver 900 database and the mid-tier fileservers 915. The middleware system 910 typically resides on a separate computing platform to the fileserver 900. The middleware system 908 converts the format of data available from the back-end database, for example a legacy database system, to a format of data readable by the mid-tier fileservers 915 and their clients 930. Such an arrangement is also useful if the data required by, or the technology of the mid-tier or client systems change. Then, only the middleware system needs to be upgraded to accommodate the changes, rather than there being a need to up-grade the, typically, very expensive and complex, back-end database system.

Another variation on the system illustrated in FIG. 8 is to incorporate a middleware system as a process on each mid-tier fileserver. This has the advantage of removing the need for a dedicated middleware computing platform, but suffers with the disadvantage that more than one middleware process needs to be amended in the case of an upgrade.

A further variation on the systems illustrated in FIGS. 8 and 9 is that one or more of the clients 830 and 930 have there own cache databases on their hard disk drives 835 and 935. In this way, it would be possible for the clients to hold copies of data, typically static data, from the mid-tier or back-end databases. However, dynamic data could be stored in a client's cache database as long as cache coherency were maintained, for example by using the read and write procedures illustrated in FIGS. 6 and 7 respectively.

Figure 10A:
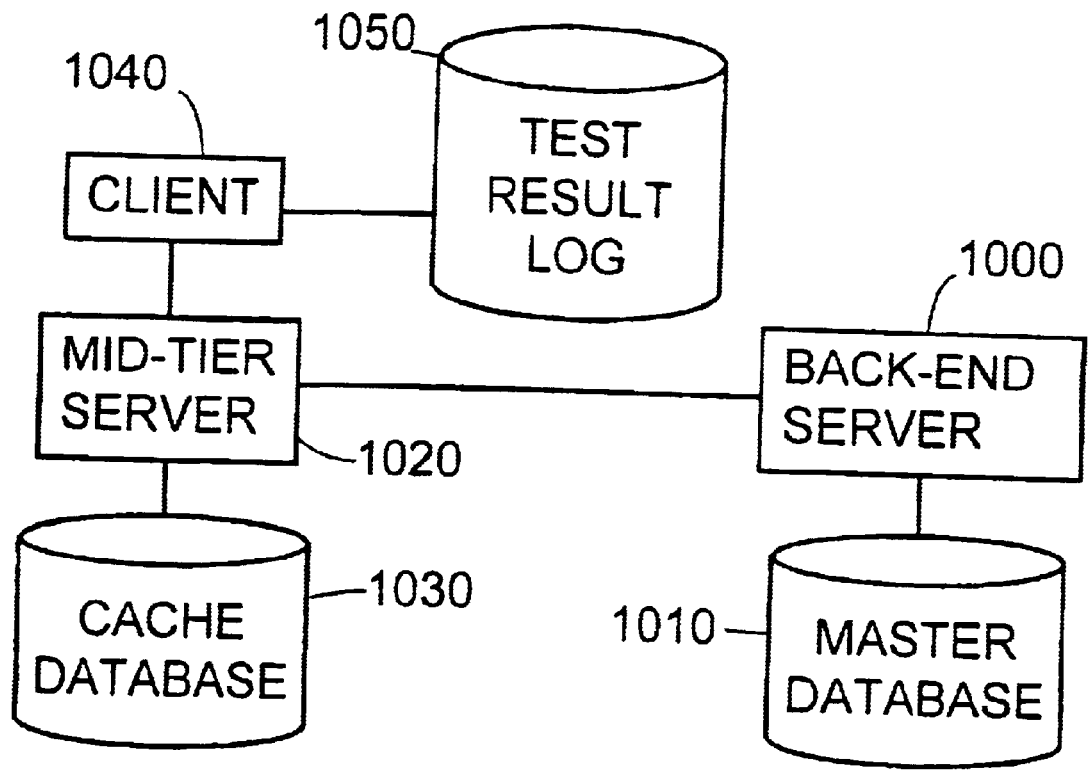
FIG. 10a is a diagram which illustrates a system for testing the performance of an embodiment of the present invention.

FIG. 10a illustrates a test harness for testing a three-tier embodiment of the present invention. The harness comprises a back-end fileserver 1000 which supports a master Oracle database 1010 stored on an external disk drive device: all master database access is controlled by the back-end fileserver 1000. The master database 1010 holds the master version of the data. A mid-tier fileserver 1020 is connected to the back-end fileserver via a ten Mbit/s 802.3 10 baseT communications link. The mid-tier fileserver 1020 supports an Oracle cache database 1030 which stores data persistently on an external disk drive, but which also stores recently used data in main memory. A client 1040 is connected to the mid-tier fileserver 1020 and has a test result log 1050. Although the client 1040 is shown to be logically separate, it actually resides on the mid-tier fileserver for testing purposes.

The mid-tier fileserver 1020 controls both the cacheing process and accesses to the back-end fileserver 1000. The client 1040 controls the performance tests which are described below, and collates and stores accumulated test results.

The test harness uses Orbix (TM) as the communications mechanism for carrying information between the back-end fileserver 1000 and the mid-tier fileserver 1030. The mid-tier fileserver 1020 and the back-end fileserver 1000 are both SUN (TM) SPARCstation 20 computer systems. In practice, however, whilst the mid-tier fileserver 1020 might well be a SPARCstation 20, the back-end fileserver 1000 would more likely be a large Unix (TM) based fileserver or even an IBM mainframe fileserver. The mid-tier fileserver 1030 and the back-end fileserver 1000 use ProC (TM) as the interface between Oracle (TM) and the cache control mechanisms which are software routines written in the C and the C programming languages. The back-end fileserver 1000 has an SGA (not shown) which is held in virtual memory, which will usually be in main memory (RAM) in a well-tuned system. Each read access made to the master database 1010 has the effect of copying the data read from the master database to the SGA, if it is not already present in the SGA. The implications of this are discussed in more detail more.

All tests were based on a 50 MB table stored in the master database 910. The table comprised 250,000 rows of data. Each row was arranged as follows:

| ID | version | data (x200 columns) | | | | | | | | | | | | | | | | | | | | | |
|----|---------|---|---|---|---|---|---|---|---|---|---|---|---|---|---|---|---|---|---|---|---|---|---|
| 8 | 8 | 1|1|1|1|1|1|1|1|1|1|1|1| ... |1|1|1|1|1|1|1|1|1|1|

Each row had an 8-digit numeric identity (ID), an 8-digit numeric version and 200 data columns, each data column contained one character.

Each row had a corresponding index entry, although, as has already been mentioned, the index for Oracle may be arranged as a B-Tree optimised for rapid searching on the "key" fields in the data rows. One advantage of the B-Tree approach is that search time does not increase rapidly with size of indexed table.

The index is created so that, for each row referenced, the index contains both row address and version number (or time stamp). The effect of this arrangement is that whenever the client (or mid-tier fileserver) requests the version number of a row stored in the master database, the back-end fileserver retrieves the index for the row and, in doing so, finds the version number for the row within the index. Recognising the version number in the index, the back-end fileserver does not access the actual row of data to retrieve the index.

Tests were carried out by randomly accessing the table to retrieve a varying number of columns ranging from one column to 200 columns in steps of 10. Random accesses were selected as this was thought to be relatively realistic, in particular because statistics based on sequential access would be distorted by Oracle's (TM) internal SGA cacheing mechanisms.

Tests were carried out within the following scenarios:
 no cacheing;
 cacheing with an empty cache database;
 cacheing with a full cache database, but unknown data in the SGA; and
 cacheing with a full cache database, with the Oracle (TM) index in the SGA.

Figure 10B:
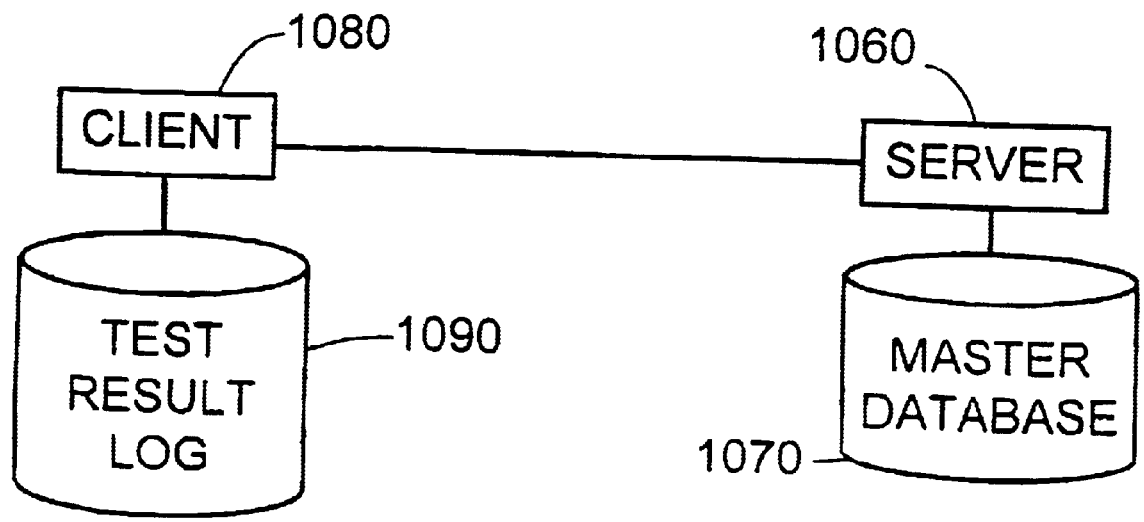
FIG. 10b is a diagram which illustrates a system for establishing a set of base performance results.

The arrangement in FIG. 10b was the basis for direct client to fileserver tests. The arrangement comprises a fileserver 1060 having a master database 1070. The fileserver 1060 is connected to a client 1080 via an Orbix (TM)-based communications link. The client 1080 has a test result log 1090. In this scenario, the cacheing technique was not used since the client did not have any cached data to access. Instead, communications and data retrieval by the client 1080 was always directly to and from the fileserver 1060, where the fileserver had access to the data required by the client in the master database 1070. Therefore, the data in the master database 1070 was accessed each time the client 1080 requested data. The results obtained from this test scenario are used as a baseline for comparison against the test results from the scenarios which employ cacheing, which are described below.

The second test scenario used cacheing, but started with no cached data in the cache database 1030. Thus, the mid-tier fileserver 1020 had to retrieve all data from the back-end fileserver 1020. This is the worst-case scenario for the cacheing technique. It represents the case where data has to be retrieved from the back-end fileserver 1000 and written to the cache database 1030. This will occur either if the data is absent from the cache database 1030 or if the data in the cache database is inconsistent.

The third scenario was arranged so that the cache database 1030 contained identical data to that held on the master database 1010. However, in this scenario, there was no control over which data started in the SGA of the back-end fileserver 1000. That is to say, the index, which contains the ID and the version of each database table row, was not fixed into the main memory of the back-end fileserver 1000. Therefore, the back-end fileserver 1000 needed potentially to retrieve the requested data and the respective index from the master database 1010 and place them into the SGA several times during each test.

In the final scenario, as in the previous scenario, the cache database 1030 on the mid-tier fileserver 1020 contained identical data to the master data held on the master database 1010. However, this time, the index was purposely placed into the SGA on the back-end fileserver 1000. This was achieved by sequentially accessing the ID and time stamp of each row of the master data (but not the data itself) on the master database 1010 from the back-end fileserver 1000 before the test was carried out. This had the effect of creating an index entry in the SGA for each database row accessed from the database table. With the whole index copied into the SGA, the index could be accessed to compare the version of the master data with versions of the cached, mid-tier data more rapidly and efficiently than if none of the index, or only parts thereof, resided in the SGA. That is to say, if the index is in the SGA, the fileserver only needs to make main memory accesses to compare versions instead of needing to make disk accesses to the master database 1010.

The results obtained from the tests related to CPU utilisation on the back-end fileserver 1000 and input/output (I/O) between the back-end fileserver 1000 and the master database 1010. The CPU utilisation was measured using the UNIX 'clock( )' system call, which measures CPU time used by the process issuing the call. I/O was measured using the Oracle (TM) view 'v$filestat', which enabled measurement of I/O activity on the Oracle (TM) table space used for the tests.

Figure 11:
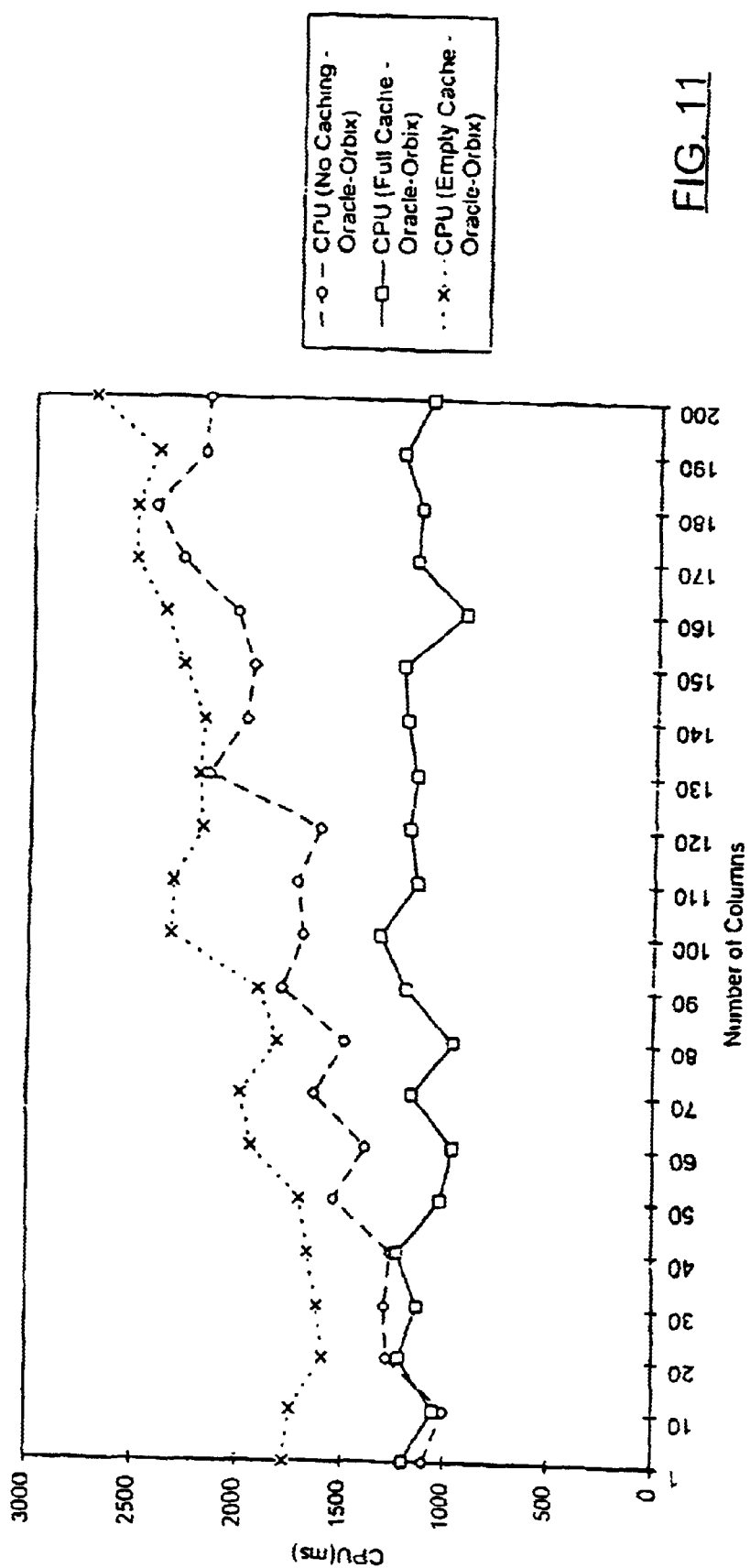
FIG. 11 is a graph which shows the CPU overhead for different cacheing or non-cacheing scenarios.

FIG. 11 is a graph illustrating a comparison between the CPU utilisation for: the scenario using no cacheing; the scenario using a full cache; and the scenario using an empty cache. The graph shows that CPU utilisation is significantly better in the case where the cache is fully utilised, compared with the direct client/server case (no cacheing). The utilisation is comparable when the complexity (the number of columns read) of the data being retrieved is low. However, as the complexity rises, so the advantages of the fully-cached arrangement become apparent. As can be seen from the graph, there is a penalty to pay in the case of an empty or inconsistent cache, when data must be retrieved from the back-end fileserver 1000. These results show that by incorporating the version, or time-stamp, in the index, irrespective of whether the index entries are in the SGA or the master database, the CPU processing overhead is greatly reduced. Clearly, this improvement in performance will be particularly significant where many mid-tier fileservers or clients are attempting to access the fileserver at substantially the same time.

In carrying out the experiments, the present inventors appreciated that the results plotted in FIG. 11 represent combined Orbix (TM) and Oracle (TM) CPU utilisation. Further tests, described below, were carried out to determine how the CPU utilisation for database access only, using Oracle (TM), is affected by the various cacheing and non-cacheing arrangements.

Figure 12:
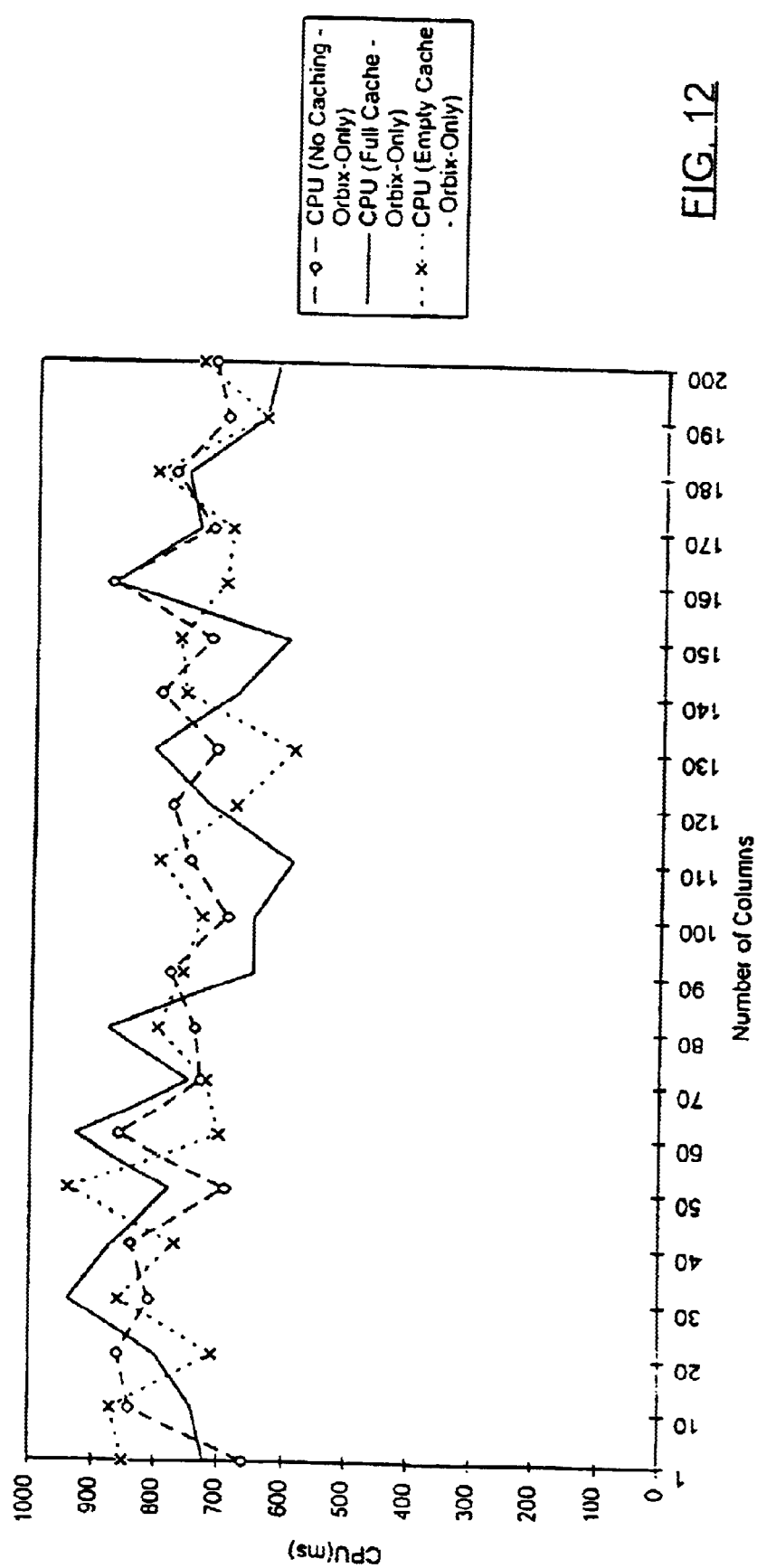
FIG. 12 is a graph which shows the CPU overhead for communications processing only for different cacheing or non-cacheing scenarios.
Figure 13:
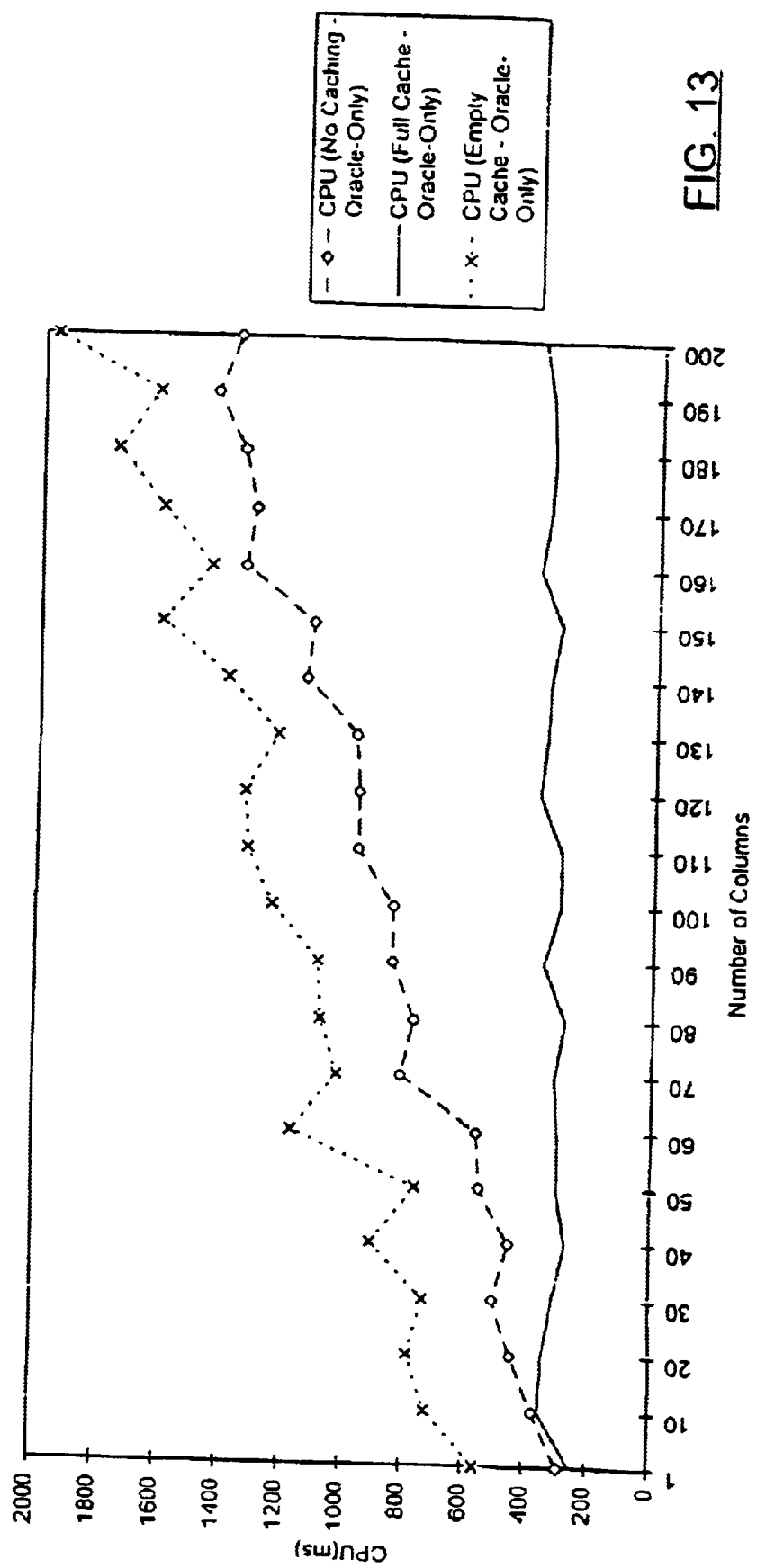
FIG. 13 is a graph which shows the CPU overhead for database access only for different cacheing or non-cacheing scenarios.

FIG. 12 is a graph showing the CPU utilisation for only the Orbix (TM) parts of the processing. The graph shows that CPU utilisation is similar for all three arrangements. FIG. 13 is a graph which shows CPU utilisation on the fileserver due only to Oracle (TM) database processing. It is apparent that the combined data plotted in FIG. 12 and in FIG. 13 matches closely the data plotted in FIG. 11, which gives a good level of confidence that the separate tests were constructed correctly.

The data plotted in FIG. 13 indicates more clearly that the difference between the full, consistent cache and the no-cacheing or the empty or inconsistent cache situations is much more marked. It is shown that at high complexities, a four-fold reduction in CPU utilisation can be achieved by using data cached at the mid-tier.

It is also clear from FIG. 13 that there is a fixed overhead in using the cacheing technique when data has to be retrieved from the master database at the fileserver. When data complexity is low, the overhead forms a significant proportion of the overall time, but as complexity rises, the overhead decreases as a proportion of the total. That is to say, for one column of data only, the overhead is about one half of the total access time, while for two hundred columns of data, the overhead is only about one sixth of the total access time.

On the basis of this information, it is clear that Orbix is responsible for using a high proportion of the CPU's time. Indeed, Orbix is known to be a complicated communications mechanism which incurs a high CPU overhead. Therefore, it is envisaged that by using a simpler communications mechanism, for example a Unix "sockets" approach, the CPU overhead could be reduced significantly in terms of communications processing, thereby greatly improving overall CPU efficiency.

Figure 14:
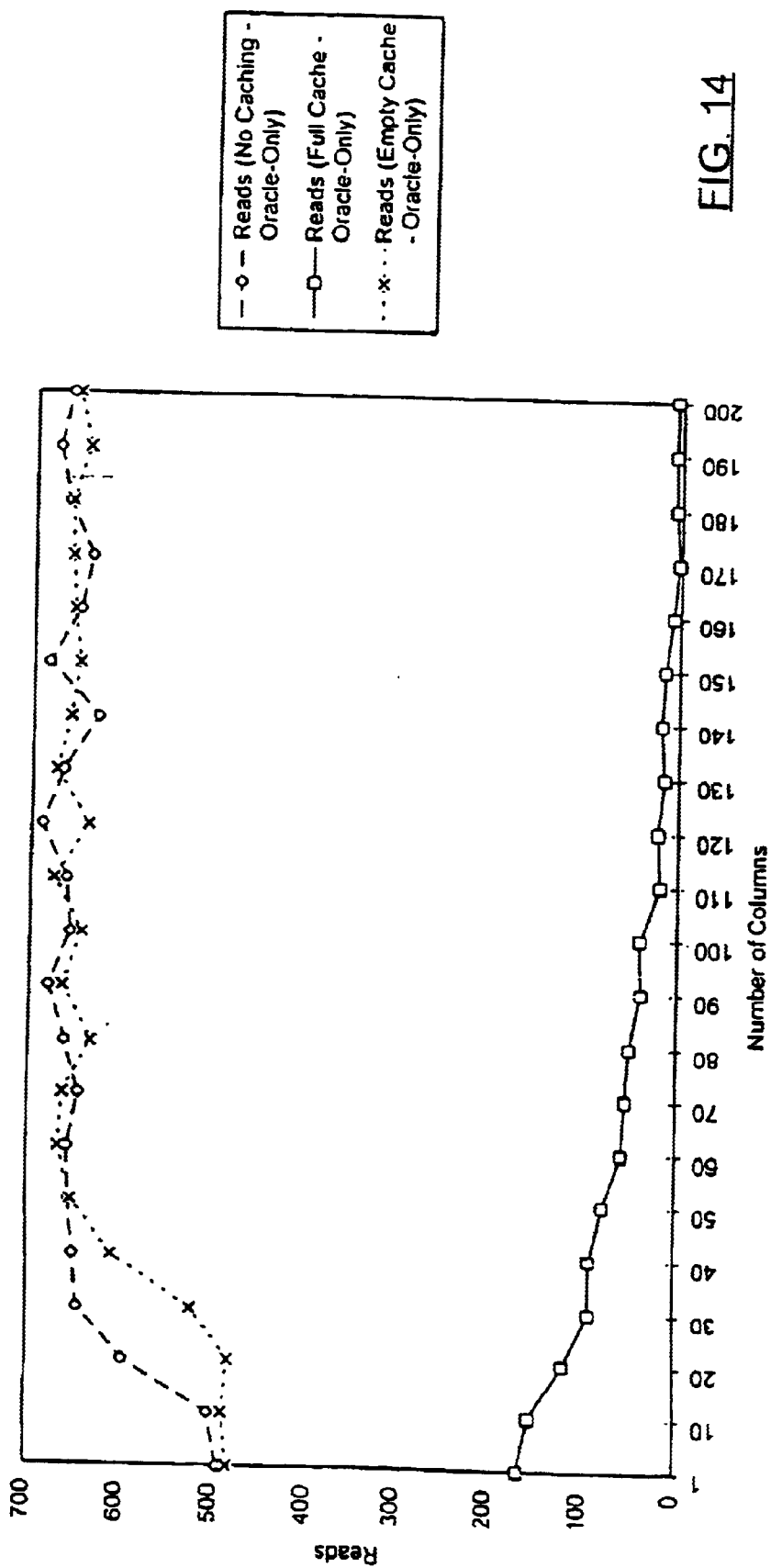
FIG. 14 is a graph which illustrates the number of read accesses required to retrieve data from a database for different cacheing or non-cacheing scenarios.
Figure 15:
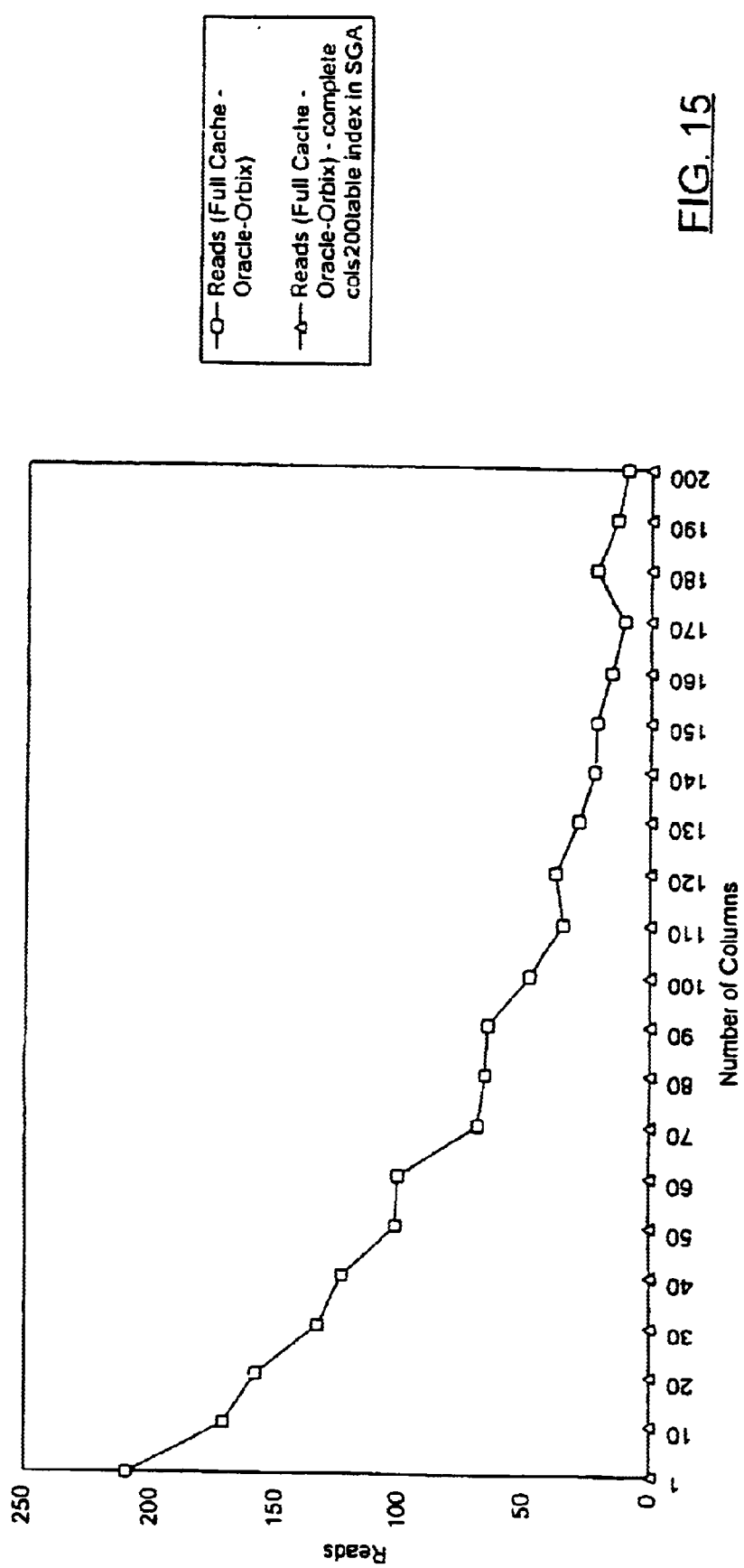
FIG. 15 is a graph which illustrates how database access performance can be improved by maintaining index data in main memory rather than on an external storage device.

It was expected that the use of the cacheing technique would bring significant I/O benefits in the case where data is correctly cached in the mid-tier fileserver. The graph in FIG. 14 plots the number of reads against the complexity of the reads. The graph indicates that for both the direct, client/server access and the empty/inconsistent cache cases, reads run at a significant level irrespective of complexity. On the other hand, for the full, consistent cache case, reads appear to decline with complexity. This, however, is an artefact of the experimental method used. As outlined above, in the full cache case, only the index is being accessed: the index is about 6 MB in size. Each time a row from a table or an index entry is read, the whole block, or page, containing the row or entry is in fact transferred to an area in the SGA called the data buffer cache. A block is typically 2048 bytes large and therefore contains roughly ten data rows. The data buffer cache is about 8 MB in size. Therefore, as more index entries are read, a greater proportion of the index is found in the data buffer cache and a respective greater proportion of index look-ups is satisfied by main memory access only. In the limit, if the entire index is read, and if no other processes are reading from or writing to the master database in the meantime, then the entire index will be copied to the data buffer cache area of the SGA. Then, no I/O will be required whatsoever. FIG. 15 is a graph which plots test results which show this theory to be correct. As can be seen from the graph, there are no reads when the complete index is in the SGA, and there are declining reads when the index is not initially in the SGA.

The results overall indicate that the cacheing technique decreases CPU overhead as a result of having the version number in the index entries. Also, the read overhead reduces as more index entries move to the SGA. Although detailed tests have not been carried out under multiple client conditions, it is a safe assumption that both a reduced CPU overhead and a reduced read requirement should improve fileserver performance and response times for clients. Indeed, the performance improvement should become more significant as more clients or mid-tier fileservers are connected to the fileserver and have access to the back-end, master database. Also, other procedures controlled by the fileserver, for example user authentication or database house-keeping, will benefit from the increase in both CPU and database access performance.

Finally, the results also indicate that it is essential to select a high performance communications mechanism in order to gain a maximum benefit from the novel cacheing technique described above.

The skilled addressee will appreciate that the invention can be applied to almost any environment implementing cache databases, or equivalent. The decision to use the invention is purely one based on whether the invention provides an optimum system in terms of performance.

What is claimed is:

1. A method for checking the consistency of an item of data in a cache database with a respective item of data in a master database by comparing a first key stored in association with the item of data in the cache database with a second key stored in association with an index entry for the respective item of data in the master database.

2. A method for retrieving an item of data from one of a cache or a master database, the master database comprising a plurality of items of master data and an index containing entries corresponding to one or more of the items of master data, the cache database containing a cached copy of at least one item of the master data, the method comprising the steps of:

reading a first key stored in association with a cached copy of a required item of data from the cache database;

reading a second key stored in association with an index entry for a respective item of master data from the master database;

comparing the first key with the second key; and retrieving in the event the first and second keys are the same the cached copy of the item of data or in the event the first and second keys are different the respective item of master data.

3. A method according to claim 1, wherein the first and second keys are time-stamps.

4. Use of a method according to claim 1 in a client/server system.

5. A database fileserver apparatus comprising:

input means for receiving a conditional read request for an item of data stored in the database, the request including a first key for a previously-retrieved copy of the item of data;

means for accessing an index of the database and reading an index entry for the requested item of data, the index entry including a second key for the stored item of information;

means for comparing the first and second keys; and means if the keys are the same for returning an indication that the previously-retrieved copy of the item of data is consistent or if the keys are different for reading from the database and returning a copy of the item of data.

6. A database index, wherein at least one index entry in the index includes at least:

identity information for identifying an item of information in the database;

location information for indicating the location in the database of the item of information; and version information which changes each time the respective information in the database changes.

7. A method according to claim 2, wherein the first and second keys are time stamps.

8. Use of method according to claim 2 in a client/server system.

9. A method for checking the consistency of an item of data in a cache database with a respective item of data in a master database by comparing a first key stored in association with the item of data in the cache database with a second key stored as a component of an entry for the respective item of data in the master database.

* * * * *